United States Patent
van de Sanden et al.

(10) Patent No.: US 9,415,633 B2
(45) Date of Patent: Aug. 16, 2016

(54) ASSEMBLY COMPRISING A RADIALLY INTERMEDIATE JOINT AND CORRESPONDING METHOD OF JOINING TWO COMPONENTS

(75) Inventors: John van de Sanden, Nieuwegein (NL); Cornelius Petrus Antonius Vissers, Den Dungen (NL); Victor Haans, Rotterdam (NL); Maarten Noordman, Erichem (NL)

(73) Assignee: AKTIEBOLAGET SKF, Gothenburg (SE)

( * ) Notice: Subject to any disclaimer, the term of this patent is extended or adjusted under 35 U.S.C. 154(b) by 604 days.

(21) Appl. No.: 13/700,176

(22) PCT Filed: May 28, 2010

(86) PCT No.: PCT/EP2010/003244
§ 371 (c)(1),
(2), (4) Date: Feb. 11, 2013

(87) PCT Pub. No.: WO2011/147432
PCT Pub. Date: Dec. 1, 2011

(65) Prior Publication Data
US 2013/0145599 A1   Jun. 13, 2013

(51) Int. Cl.
*F16C 33/58* (2006.01)
*B60B 27/00* (2006.01)
(Continued)

(52) U.S. Cl.
CPC ............ *B60B 27/0078* (2013.01); *B21D 39/06* (2013.01); *B21K 1/00* (2013.01); *B21K 25/00* (2013.01); *B23P 11/00* (2013.01); *F16B 17/002* (2013.01); *F16C 19/186* (2013.01); *F16C 33/60* (2013.01); *F16C 35/067* (2013.01);
(Continued)

(58) Field of Classification Search
CPC .......... B21K 1/04; B21K 25/00; F16B 4/004; F16B 11/00; F16B 11/002; F16C 33/58; F16C 2226/12; F16C 2226/16; Y10T 29/49909; Y10T 403/4933; Y10T 403/62; F16L 13/146
See application file for complete search history.

(56) References Cited

U.S. PATENT DOCUMENTS

| 2,804,679 A | 9/1957 | Tracy |
| 3,529,856 A | 9/1970 | Smith et al. |

(Continued)

FOREIGN PATENT DOCUMENTS

| DE | 102006033116 A1 | 1/2008 |
| DE | 102008004924 A1 | 7/2009 |

(Continued)

*Primary Examiner* — Michael P Ferguson
(74) *Attorney, Agent, or Firm* — Bryan Peckjian; SKF USA Inc. Patent Dept.

(57) ABSTRACT

An assembly includes a first component joined to a second component by an intermediate joint. The first component has a first joining surface arranged coaxially and spaced in a juxtaposition around a second joining surface of the second component such that a groove is defined between the first and second joining surfaces. One of the first and second joining surfaces includes a concave portion and the other of the first and second joining surfaces has a convex portion radially opposite the concave portion, and the groove is formed by the convex and concave portions. The intermediate joint is formed by an insert ring pressed into the groove and deformed such that material of the insert ring fills the concave portion and surrounds the convex portion, and this locks the first and second components relative to each other in both axial directions.

17 Claims, 5 Drawing Sheets

(51) Int. Cl.

| | | |
|---|---|---|
| *B21D 39/06* | (2006.01) | |
| *B21K 25/00* | (2006.01) | |
| *B23P 11/00* | (2006.01) | |
| *F16D 1/06* | (2006.01) | |
| *F16D 1/072* | (2006.01) | |
| *F16C 19/18* | (2006.01) | |
| *F16C 43/04* | (2006.01) | |
| *F16C 33/60* | (2006.01) | |
| *F16B 17/00* | (2006.01) | |
| *B21K 1/00* | (2006.01) | |
| *F16C 35/067* | (2006.01) | |

(52) U.S. Cl.
CPC ............... *F16C 43/04* (2013.01); *F16D 1/06* (2013.01); *F16D 1/072* (2013.01); *F16C 2326/02* (2013.01); *Y10T 29/49643* (2015.01); *Y10T 29/49863* (2015.01); *Y10T 403/7051* (2015.01)

(56) References Cited

U.S. PATENT DOCUMENTS

| | | | |
|---|---|---|---|
| 3,559,946 A * | 2/1971 | Baxter, Jr. ............... | 251/129.16 |
| 4,249,298 A | 2/1981 | Kanamaru et al. | |
| 4,305,198 A * | 12/1981 | Kanamaru et al. ............ | 403/274 |
| 4,335,496 A | 6/1982 | Kanamaru et al. | |
| 4,433,932 A * | 2/1984 | Brandenstein et al. ....... | 403/261 |
| 4,618,190 A * | 10/1986 | Garman et al. ............... | 305/204 |
| 4,652,168 A | 3/1987 | Brandenstein | |
| 4,893,960 A | 1/1990 | Beier et al. | |
| 6,135,571 A | 10/2000 | Mizukoshi et al. | |
| 6,547,480 B1 * | 4/2003 | Yokota et al. ............... | 403/368 |
| 7,658,546 B2 * | 2/2010 | Clarke et al. ............... | 384/192 |
| 7,837,392 B2 | 11/2010 | Niebling et al. | |
| 2002/0104433 A1 | 8/2002 | Colombo | |
| 2003/0012475 A1 | 1/2003 | Vignotto et al. | |
| 2004/0234182 A1 | 11/2004 | Tajima et al. | |
| 2006/0045401 A1 | 3/2006 | Ishiguro | |
| 2008/0089628 A1 | 4/2008 | Kiuchi et al. | |
| 2009/0252551 A1 | 10/2009 | Kamikawa et al. | |
| 2011/0077089 A1 | 3/2011 | Hirai et al. | |
| 2013/0147257 A1 | 6/2013 | Sanden et al. | |

FOREIGN PATENT DOCUMENTS

| | | |
|---|---|---|
| GB | 2104624 A | 3/1983 |
| JP | 2009149141 A | 7/2009 |
| WO | 2007014553 A1 | 2/2007 |

* cited by examiner

ASSEMBLY COMPRISING A RADIALLY INTERMEDIATE JOINT AND CORRESPONDING METHOD OF JOINING TWO COMPONENTS

CROSS-REFERENCE

This application is the U.S. national stage of International Application No. PCT/EP2010/003244 filed on May 28, 2010, which is herein incorporated in its entirety.

FIELD OF THE INVENTION

The present invention relates to an assembly comprising a first component joined coaxially around a second component by means of a deformable insert that is pressed into a groove between the first and second components. The invention further relates to the corresponding method of joining.

BACKGROUND OF THE INVENTION

There are many applications where it is either necessary or advantageous to join a first component around a second component. When the components are made of metal, welding is a commonly employed joining technique. The heat affected zone produced from welding may, however, adversely affect the material properties of the components being joined. In the case of hardened bearing steel, for example, the heat affected zone severely reduces material hardness, which is a vital property of components like the rings of rolling element bearings.

An alternative technique is to join a first component around a second component by means of a plastic flow joint. One example of this technique is disclosed in U.S. Pat. No. 4,249,298, in which an outer member (e.g. flywheel) is joined to an inner member (e.g. shaft boss) by means of a connecting ring. A circumferential groove is formed on connecting surfaces of both members, and axial recesses are formed on an inner surface of each circumferential groove. Then, the connecting ring is placed between the inner and outer members. Finally, the connecting ring is pressed and plastically deformed such that material of the ring flows into the grooves and recess.

Because a maximum gap between the two connecting surfaces is greater than a thickness of the connecting ring in undeformed state, the connecting ring needs to be made from a malleable material, so that it can radially expand under compression to fill each circumferential groove and radially lock the inner and outer members. Copper, brass, aluminium and soft iron are mentioned as suitable materials for the connecting ring. These metals have a relatively low yield strength in comparison with e.g. steel. Iron, for example, has a yield strength of approximately 50 MPa, while carbon steels have a yield strength of 250-1300 MPa. The method of joining disclosed in U.S. Pat. No. 4,249,298 is therefore not suitable for components which, in use, are subjected to high axial loading, since the joint must then possess a high shear strength.

Consequently, there is room for improvement.

SUMMARY OF THE INVENTION

The present invention resides in an assembly comprising a first component joined to a second component by means of an intermediate joint. The first component has a first joining surface arranged coaxially and in spaced juxtaposition around a second joining surface of the second component, such that a groove is defined between the first and second joining surfaces. The intermediate joint is formed by an insert ring that is pressed into the groove. According to the invention, at least a section of the groove has an arcuate geometry.

The arcuate geometry is formed in that one of the first and second joining surfaces comprises a concave portion and the other of the first and second joining surfaces comprises a convex portion, radially opposite from the concave portion. When the insert ring is pressed into the groove, it is deformed and adopts the shape of the arcuate section, such that material of the insert ring fills the concave portion and surrounds the convex portion. Consequently, the first and second components are locked relative to each other in both axial directions. Further, the arcuate geometry of the groove allows the insert ring to be made from a high strength material, meaning that the resulting joint has excellent shear strength in both axial directions.

Suitably, the insert ring has a volume that fills arcuate section to a degree that is sufficient to provide the necessary joint strength in both axial directions. In a preferred embodiment, the volume of the insert ring is at least equal to a volume of the arcuate section of the groove. This helps ensure that the arcuate section is completely filled with material of the insert ring, which maximises shear strength in both axial directions.

Further, the arcuate section of the groove is suitably designed such that the convex portion does not protrude into a recess defined by the concave portion. This groove design helps ensure that the arcuate section is completely filled with insert ring material at a second side of the arcuate section, opposite from a first side at which the insert ring enters the groove.

In some embodiments of the invention, the concave and the convex portions are formed by conical surfaces at the first side of the arcuate section and/or at the second side of the arcuate section. Alternatively, at the first side of the arcuate section, at least part of the convex portion is defined by a first radius and, radially opposite therefrom, at least part of the concave portion is defined by a second radius. A difference between the first radius and the second radius (radial gap) is preferably equal to the thickness of the insert ring in an undeformed state. When the first side of the arcuate section is defined by opposing conical surfaces, the gap between the two surfaces is suitably also equal to the thickness of the undeformed insert ring. Thus, radial locking of the first and second components is facilitated.

At the second side of the (arcuate section of the) groove, at least part of the convex portion may be defined by a third radius which is essentially equal to the first radius. The third radius can also be smaller than the first radius, which enables relatively more material to surround the convex portion at the second side. This is advantageous when the joint requires greater axial strength in the corresponding direction. Further, the second side of the concave portion may be at least partly defined by a fourth radius, which is somewhat smaller than the second radius. In a preferred embodiment, the difference between the third radius and the fourth radius is slightly smaller than the thickness of the insert ring in undeformed state. Also, when the second side of the arcuate section is defined by opposing conical surfaces, the gap between the two surfaces may be slightly smaller than the gap at the first side. The difference in gap width between the first and second sides allows for a slight narrowing of the insert ring which can occur when it is deformed around an apex of the groove. As a result, the second side of the groove will be completely filled with material, thereby maximising the strength of the joint.

Thus, a joint according to the invention does not require a radial expansion of the deformed insert ring. The arcuate geometry of the groove between the first and second components enables the formation of a joint which locks the components relative each other in both axial directions, while requiring relatively little plastic deformation of the insert ring. As a result, the insert ring may be made from a high-strength material. A high-strength material should be understood as a material with a yield strength of between 250 and 1200 MPa. In a preferred embodiment, the insert ring is made from a heat-treatable steel (i.e. a quenched and tempered steel) with a yield strength of between 800 and 1200 MPa, more preferably between 1000 and 1200 MPa.

When the insert ring is made from a material with a yield strength in this region, a surface of the convex portion, at the first side, suitably has a maximum angle of between 28 and 35 degrees, relative to a reference line parallel to the axial centreline of the assembly. Further, the concave portion at the second side of the groove suitably also has a maximum angle of between 28 and 35 degrees, relative to the reference line. This groove geometry allows the required degree of plastic deformation of the insert ring, and the resulting joint has excellent shear strength in both axial directions.

When the application in question does not require such a high degree of shear strength, the insert ring can be made from a material with a lower yield strength of between e.g. 250 and 700 MPa. The first side of the convex portion may then have a maximum angle of between 35 and 42 degrees, and the second side of the concave portion may have a maximum angle of between 35 and 42 degrees. The greater ductility of such lower-strength materials allows the groove geometry to be more steeply arcuate, which in turn allows a relatively greater volume of material at either side of the convex portion. This increases the shear strength of the joint, meaning that groove geometry can be adapted to the material of the insert ring, so as to form a joint with the required strength.

In a further development of the invention, the groove additionally comprises a cylindrical section at the entrance side of the groove. The advantage of this development is improved stiffness of the first and second components at the entrance side. Also, the arcuate section of the groove may be advantageously positioned in a region of maximum cross-section of the first and/or second component, so as to optimise component strength.

Depending on the assembly, an axial length of the groove between the first and second joining surfaces can be equal to an axial length of the first and/or second component. In one such example, the first component is a flange part of a flanged bearing ring and the second component is a ring part comprising a raceway for accommodating rolling elements. The second joining surface may be provided on an outer circumference of the ring part. Alternatively, the second joining surface may be provided on a recessed section of smaller diameter, thereby creating an axial abutment on the ring part. Such an axial abutment has the advantage of providing a reference surface against which an opposing surface of the flange part can be positioned, to facilitate the coaxial arrangement of the flange part around the ring part.

In an advantageous embodiment of an assembly according to the invention, the first component is a separate inner ring of a wheel bearing unit and the second component is a flanged inner ring of the bearing unit. The advantage of a wheel bearing unit according to the invention is that there is no need to provide the flanged inner ring with an axial extension adapted for orbital forming around the separate inner ring.

In a further development of this embodiment, an inboard axial side face of the flanged inner ring is provided with face splines for driven rotation of the bearing unit. The advantage of this development, relative to a wheel bearing unit in which face splines are provided on an orbitally formed portion, is that the inboard axial side face, and thus also the splines, can be hardened.

Additionally, in wheel end applications, and other applications of the invention where the joined components will be subject to environmental contaminants such as moisture, exposed parts of the joint are preferably treated with e.g. a polymer sealant. Thus, the deformed insert ring is protected against corrosion.

As mentioned, groove geometry and the material of the insert ring used in an assembly according to the invention are selected depending on the axial loading which the joint must withstand. In some embodiments, the insert ring is formed from a tube material. In other embodiments, the ring is formed from sheet material. The advantage of using sheet is that a wider range of materials are available in sheet form than in tube form, which facilitates selection of the optimal material.

Furthermore, the insert ring can be formed from a single section or from two or more sections which together form a ring shape. In a further development of the invention, the two or more sections comprise a radial extension and the joining surfaces of the groove comprise a corresponding radially extending recess. In one example, the insert ring is formed from two sections, one of which comprises a radial extension in a radially outward direction, the other of which comprises a radial extension in a radially inward direction. Further, the first joining surface comprises a corresponding recess for receiving the radially outward extension and the second joining surface comprises a corresponding recess for receiving the radially inward extension. The effect of the one or more radial extensions and corresponding recesses is that the insert ring is rotationally locked with respect to both the first and second components, and the joint is capable of transferring torque. This further development may be used to advantage in a wheel bearing unit as described above, whereby the flanged inner ring and/or the separate inner ring is provided with face splines for torque transfer.

In a still further development, the groove and the insert ring may have a non-circular cross-section; for example, a triangular shape with rounded corners. Again, the advantage of this development is that torque can be transferred via the joint.

The invention is not restricted to the joining of parts of bearing components, and the corresponding method may be utilized in any application where it is advantageous to join first and second components by means of a high-strength joint formed by an intermediate component pressed into a gap between radially opposite joining surfaces of the first and second components. The method according to the invention comprises the following steps:

providing a concave joining surface on one of the first and second components;

providing a convex joining surface on the other of the first and second components;

arranging the first component coaxially around the second component, such that the convex and concave joining surfaces are radially opposite each other and a radial gap is formed therebetween;

pressing an insert ring into the radial gap, such that the ring is deformed adopt the shape of the gap and form a joint between the first and second components.

The method of the invention allows the formation of a high-strength joint which locks the first and second components relative to each other in both axial directions. In one embodiment, the method is applied to join a flange to a tube. In a further embodiment, the method is applied to mount a bearing on a shaft and/or in a housing. Suitably, a concave joining surface is provided on e.g. a bore of the bearing inner ring and a convex joining surface is provided on the shaft. When an insert ring is pressed into the gap between the joining surfaces, the bearing inner ring is locked to the shaft. Similarly, a concave joining surface can be provided on e.g. a bore of a housing and a convex joining surface can be provided on an outer circumference of the bearing outer ring. When an insert ring is pressed into the gap, the bearing outer ring is locked to the housing. An advantage of providing two joints in accordance with the invention is a play-free mounting of the bearing, which improves load-carrying capacity. Other advantages of the present invention will become apparent from the detailed description and accompanying figures.

BRIEF DESCRIPTION OF THE DRAWINGS

FIG. 1b is a detail of the groove depicted in FIG. 1a;

DETAILED DESCRIPTION OF THE INVENTION

Figure 1A:
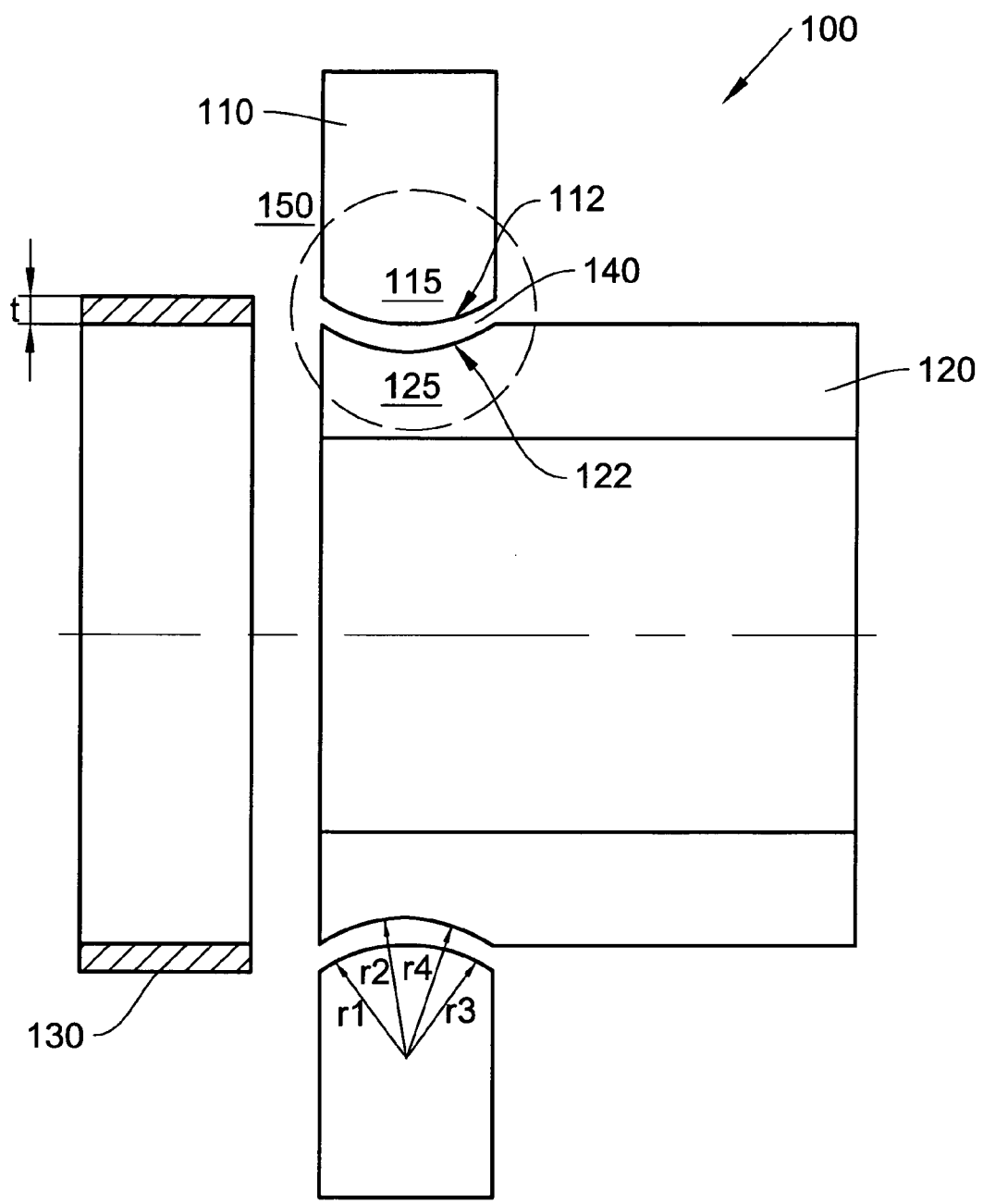
FIG. 1a is a cross-sectional view of an example of an assembly comprising a groove according to the invention, prior to the formation of a joint between first and second components of the assembly.

An example of an assembly that can be formed according to the invention is shown in cross-section in FIG. 1a, prior to a final step of joining. The assembly is a flanged bearing ring 100 comprising a flange part 110 and a ring part 120, which are adapted to be joined by means of an insert ring 130. In the example shown, the ring part 120 is a bearing outer ring, in which case an inner cylindrical surface of the ring part is suitably provided with one or more raceways for accommodating one or more rows of rolling elements. The flange 110 suitably comprises mounting holes, to enable the flanged bearing ring 100 to be fixed to a mounting structure or to enable e.g. a vehicle wheel and brake disk to be attached to the flange 110.

In general, flanged bearing rings are manufactured by means of hot forging, after which the flanged ring is machined to the desired tolerances. One advantage of forming a flanged ring from two separate parts is that the flange and cylindrical ring can be machined separately. The flange and the ring are simple shapes which are more economical to machine than objects of more complex shape, such as a flanged ring.

In the assembly of FIG. 1, the flange part 110 is joined to the ring part 120 by pressing the insert ring 130 into a groove 140 formed between a first joining surface 112 of the flange part 110 and a second joining surface 122 of the ring part 120. The first and second joining surfaces 112, 122 refer to the respective surfaces of the flange part 110 and of the ring part 120 which are in contact with the insert ring 130 after it has been pressed into the groove 140.

According to the invention, at least part of the groove 140 comprises an arcuate section, defined by a radial gap between opposing convex and concave joining surfaces. The effect of the invention, as will be explained in greater detail below, is that the ring part 120 and flange part 110 are locked relative to each other in both axial directions. Further, the invention enables the formation of a joint with excellent shear strength in both axial directions.

In the depicted example, the entire groove 140 has an arcuate geometry, which has been formed by providing a convex portion 115 on the first joining surface 112 and a concave portion 125 on the second joining surface 122. Alternatively, the groove 140 may be formed by providing the first joining surface with a concave portion and the second joining surface with a convex portion. Preferably, the part which is more likely to move comprises the convex joining surface.

The ring part 120 and the flange part 110 are made from bearing steel in this example, and the concave and convex surfaces may be formed in e.g. a hard-turning operation or a grinding operation. Grinding produces a rougher surface finish than hard turning, which is thought to be preferable. After the insert ring 130 has been pressed into the groove to form the joint, friction will additionally inhibit relative movement between the insert and the first and second joining surfaces.

The insert ring 130 is pressed into the annular groove 140 from an entrance side 150 of the groove. The ring material plastically deforms so as to adopt the shape of the arcuate section of the groove 140, and form a joint between the flange part 110 and the ring part 120. To completely fill the arcuate section, the insert ring 130 preferably has a volume that is at least equal to the volume of the arcuate section. Also, the insert ring 130 preferably has a thickness t that is equal to a maximum radial gap between the first and second joining surfaces of the arcuate section. Further, the insert ring 130 possesses a suitable ductility to enable the required degree of plastic flow and has a yield strength that is appropriate for the expected application forces which the joint must withstand in use. In the example shown in FIG. 1a, the insert ring 130 has a thickness of 1 mm and is made from a heat-treatable steel—i.e. a quenched and tempered steel—with a yield strength of approximately 1000 MPa. For example, a steel of grade DIN C55. Such a steel is stronger than e.g. a low carbon steel, but is also less ductile. The geometry of the groove 140 therefore places constraints on the material that may be selected for the insert ring.

Figure 1B:
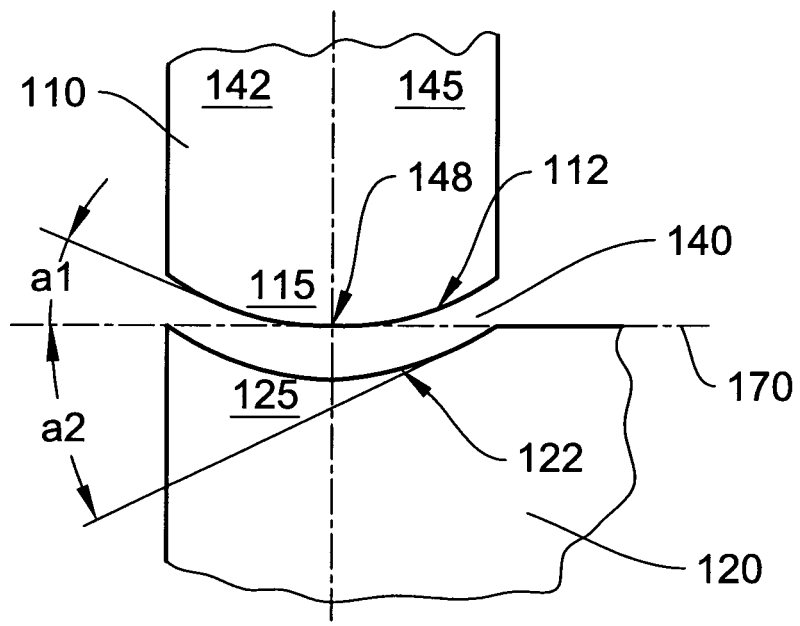

FIG. 1b shows a detail of the groove of FIG. 1a. The groove 140 has a first side 142 and a second side 145 with respect to a groove apex 148, defined by an apex of the convex portion 115. The first side 142 of the groove is defined as the side from which the insert ring is pressed in. When the insert ring 130 enters the groove 140, a leading edge of the ring will strike the convex portion at the first side 142 of the groove. If an angle $a_1$ of this convex surface, relative to a reference line 170 is too steep, further pressing of the insert ring 130 will not cause it to deform around the apex 148. Instead, the convex portion will form a barrier. The reference line 170 is parallel to an axial centreline of the assembly and passes through a maximum diameter of the concave joining surface 122, at the entrance side 150 of the groove.

The present inventors have found that an angle $a_1$ of approximately 28 to 35 degrees is an appropriate maximum angle for the surface of the convex portion 115 at the first side 142, when the insert ring is made from a heat-treatable steel. When a steel of greater ductility is used, the angle $a_1$ may be approximately 35-38 degrees for e.g. a carburizing steel having a yield strength of 400-650 MPa, or approximately 38-42 degrees for a low carbon steel having a yield strength of 250-500 MPa.

The convex portion 115 may, as shown in FIG. 1a, be partly defined by a radius, or may be formed by oppositely oriented conical surfaces. The concave portion 125 may also be partly defined by a radius or by oppositely oriented conical surfaces.

In the depicted example, the insert ring will be deformed around the groove apex 148. The leading edge of the ring then encounters a surface of the concave portion 125 at the second side 145 of the groove. Again, an angle $a_2$ of this surface relative to the reference line 170 must be sufficiently shallow to allow the insert ring to completely surround the convex portion 115 at the second side 145. When the insert ring is made of heat-treatable steel, the concave portion may have a maximum angle $a_2$ of 28 to 35 degrees. For more ductile materials, the angle $a_2$ may lie between 35 and 38 degrees for e.g. a carburizing steel and between 38 and 42 degrees for a low carbon steel.

The precise dimensions and corresponding volume of the groove 140 are suitably adapted to the degree of deformation of the insert ring 130 that will take place, so that at least the arcuate section of the groove is completely filled by deformed material of the insert ring. The gap between the first and second joining surfaces 112, 122 is substantially constant, but may vary somewhat to take account of the plastic flow of the insert ring 130 as it is deformed around the groove apex 148. In the example of FIG. 1a, when the insert ring has a thickness t of 1 mm, the radial gap between the first and second joining surfaces 112, 122 is 1 mm at the first side 142 of the groove. In other words, the first side of the convex portion has a first radius $r_1$ and the first side of the concave portion has a second radius $r_2$, whereby the difference between the first and second radius is equal to 1 mm.

To compensate for a slight narrowing that can occur when the insert ring 130 is deformed around the apex 148, the radial gap between the first and second joining surfaces at the second side 145 of the groove is slightly smaller: 0.9 mm. In other words, the second side of the convex portion has a third radius $r_3$ and the second side of the concave portion has a fourth radius $r_4$, whereby the difference between the third and fourth radius is equal to 0.9 mm. Suitably, the fourth radius $r_4$ of the concave portion is slightly smaller than the second radius $r_2$. The third radius $r_3$ of the convex portion is equal to the first radius $r_1$ in this example, but the curvature of the convex portion at the second side may also be greater than at the first side. The curvature of the concave portion at the second side is then suitably modified to ensure that the groove is filled at the second side.

Also, the present inventors have found that optimal filling of the groove 140 at the second side 145 occurs when the apex of the convex portion 115 does not protrude into a recess defined by the concave portion 125. Preferably, when the first joining surface 112 comprises the convex portion, an inside diameter of the flange part 110 at the location of the groove apex 148 is equal to a maximum outside diameter of the second joining surface 122, at the entrance side 150 of the groove. When the second joining surface 122 comprises the convex portion, the outside diameter of the ring part at the location of the groove apex is preferably equal to a minimum inside diameter of the first joining surface at the entrance side of the groove. In short, the apex of the convex portion preferably coincides with reference line 170.

Figure 1C:
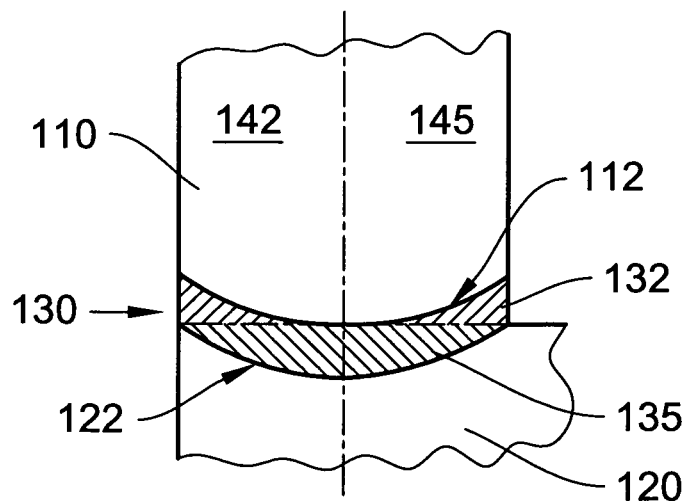
FIG. 1c is a detail of the joint formed between the first and second components.

FIG. 1c shows a detail of the joint formed after the insert ring 130 has been pressed into the groove 140. The material of the insert ring 130 has flowed around the groove apex 148 to completely fill the groove at the first side 142 and the second side 145. In other words, a first deformed portion 132 surrounds the convex portion at both sides 142, 145 and a second deformed portion 135 of the insert ring 130 fills the recess defined by the concave portion. As a result, the flange part 110 and the ring part 120 are axially locked with respect to each other in both axial directions. Radial locking of the ring part 120 and the flange part 110 is effected in that the deformed insert ring has a radial thickness equal to the gap between the first and second joining surfaces 112, 122.

When, for example, the flange part 110 is subjected to an axial force acting in the direction of the second side 145 of the groove to the first side 142, which force is large enough for the joint to fracture, the second deformed portion 135 of the insert ring remains in the recess formed by the concave portion 125, while the first deformed portion 132 remains on the convex portion 115. The shear strength of the joint is therefore partly determined in this example by the volume of material of the first deformed portion at the first side 142 of the groove 140. The shear strength is further determined by the yield strength of the material of the insert ring 130. Therefore, the shear strength of the joint in the given axial direction can be optimised by maximising the volume of the first deformed portion 132 at the first side, for the insert ring material that is used. The volume can be increased by increasing the angle $a_1$ of the convex portion 115. However, as mentioned, the insert ring must then possess the necessary ductility, meaning that a material with a lower yield strength may have to be used. The present inventors have found that the shear strength of the joint is more heavily dependent on yield strength of the insert ring material than on the volume of deformed material. Thus, for bearing applications, the insert ring 130 is preferably made from a quenched and tempered steel such as defined under "Heat-treatable steels" in Section 2 of "Key to Steel" [$22^{nd}$ edition, Verlag Stahlschlüssel Wegst GmbH].

The joint formed in accordance with the invention is solid, robust and particularly suited for the assembly of components which, in use, are subject to axial forces in both directions; for example, the flanged bearing ring(s) of a hub unit that supports a vehicle wheel.

Figure 2:
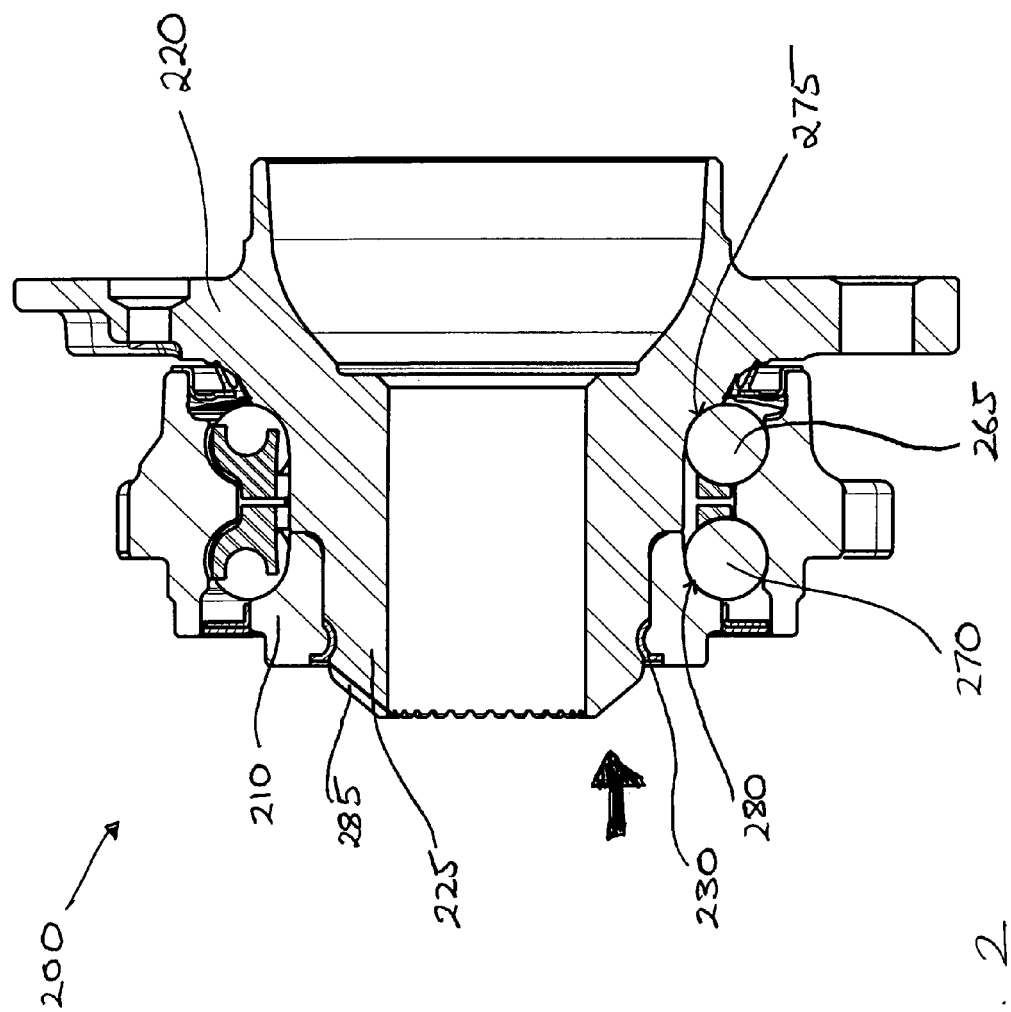
FIG. 2 is a cross-sectional view of a wheel bearing unit according to the invention.

A further application of the invention in a hub bearing unit is shown in FIG. 2, which is a cross-sectional view of an example of a hub unit 200 adapted for inner ring rotation. The hub unit comprises a flanged inner ring 220, to which a brake disk and vehicle wheel will be mounted, and further comprises a flanged outer ring 260 adapted for mounting to e.g. a steering knuckle. First and second rows of rolling elements 265, 270 are accommodated between the inner and outer rings. A first inner raceway 275 for the first row of rolling elements 265 is provided on the flanged inner ring 220. A second inner raceway 280 for the second row of rolling elements 270 is provided on a separate inner ring 210. The separate inner ring 210 is necessary in order to allow the second row of rolling elements to be inserted into the hub unit 200 after the outer ring 260 has been mounted over the first row. The separate inner ring 210 is mounted on a nose part 225 of the flanged inner ring 220. In conventional hub units, the nose part comprises an axial extension, which is orbitally formed around the separate inner ring 210, to lock up the bearing unit and set the desired amount of preload. The required axial extension adds to the material costs and weight of the hub unit. Also, because the axial extension needs to be deformable, while other parts of the flanged inner ring need to be induction hardened, an inadvertent hardening of part of the axial extension can lead to cracking when the extension is orbitally formed.

A hub bearing unit formed according to the invention overcomes these drawbacks. As shown in FIG. 2, the separate inner ring 210 has been joined to the nose part 225 of the flanged inner ring 220 by means of a deformable insert ring 230 pressed into a groove formed between respective joining surfaces of the separate inner ring and the nose part, whereby the joining surfaces comprise opposing concave and convex portions. The resulting joint not only locks the separate inner ring in place, but maintains the bearing preload.

In use, the hub unit is subject to axial forces in both directions. The present inventors have found that when a "push-out" force in the direction indicated by the arrow in FIG. 2 is exerted on the nose part 225 of the flanged inner ring, the nose part is susceptible to damage. Advantageously, the nose part is designed to possess adequate stiffness and is subjected to a hardening treatment. The entire nose part 225 may be hardened, since a hub unit according to the invention does not require a ductile axial extension. In a further development, an inboard axial surface of the nose part is provided with torque transfer means in the form of face splines 285 for cooperating with mating face splines on a constant velocity joint. Again, the invention allows teeth of the face splines to be hardened, thereby increasing the fatigue life of the torque transfer means in relation to e.g. face splines provided on an unhardened orbitally formed portion.

Figure 3A:
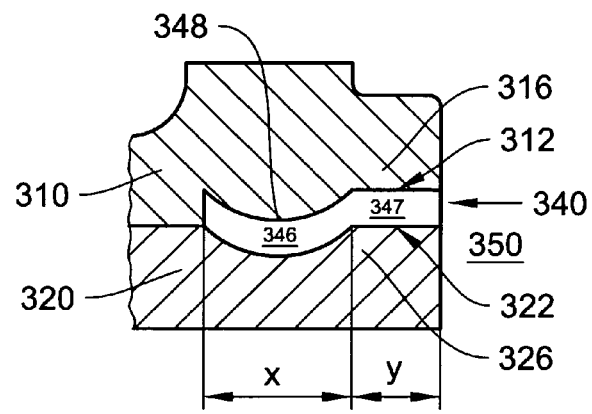
FIG. 3a-3c show examples of different groove designs.

The design of the groove may also be modified to improve the stiffness of the nose part. FIG. 3a shows an example of a modified groove design, the groove being provided between a separate inner ring 310 and a flanged inner ring 320 as depicted in FIG. 2. In accordance with the invention, the groove 340 comprises an arcuate section 346 defined by a gap between opposing concave and convex surfaces, such that when the deformable insert ring (not shown) is pressed into the groove 340, the separate inner ring 310 and flanged inner ring 320 are mechanically locked with respect to each other in both axial directions. The insert ring is pressed in from an entrance side 350 of the groove 340, at which side the groove of this example comprises a second section defined by a gap between a cylindrical portion 316 of the first joining surface 312 of the separate inner ring and a cylindrical portion 326 of the second joining surface 322 of the flanged inner ring. The groove 340 thus comprises an arcuate section 346 and a cylindrical section 347. As a result, the flanged inner ring 320 has a cylindrical geometry at the entrance side 350, which improves stiffness and reduces the likelihood of push-out damage. Also, the apex of the convex joining surface is able to be positioned in a region where the separate inner ring 310 has a relatively larger cross-section, enabling optimisation of its strength.

In one example of a car hub unit according to the invention, the arcuate section 346 has an axial length x of approximately five millimeters and the cylindrical section 345 has an axial length y of approximately three millimeters. Preferably, the axial length y of the cylindrical section is at least 2 mm, which has been found to provide the (nose part of the) flanged inner ring 320 with adequate stiffness to withstand the application forces which typically occur in a vehicle wheel end.

Figures 3B, 3C:
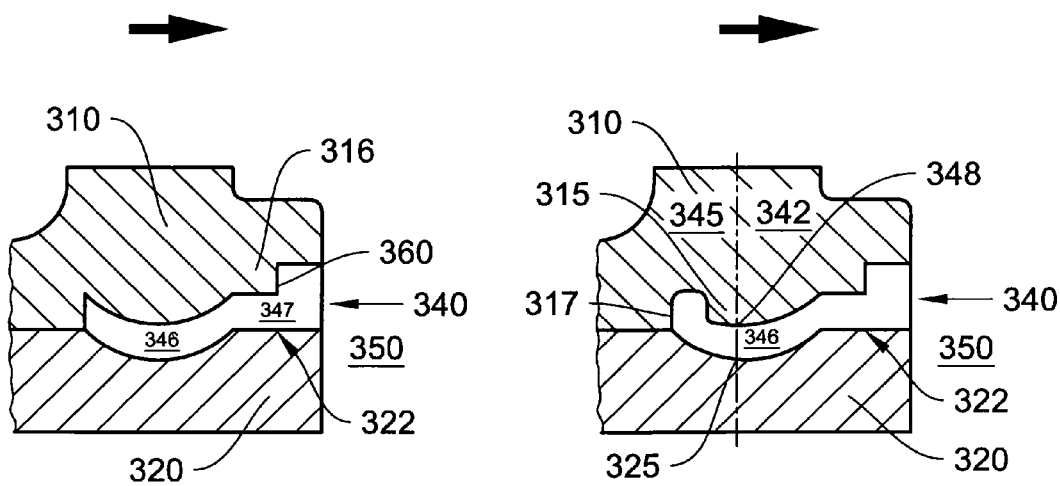

FIG. 3b shows a further example of a groove design. The groove again comprises a cylindrical section 347 at the entrance side 350 of the groove 340, defined by a gap between opposing cylindrical portions 316, 326 of the first and second joining surfaces respectively. In this example, the cylindrical portion 316 of the first joining surface of the separate inner ring 310 comprises a step. Consequently, the first joining surface of the separate inner ring 310 has an axial side face 360, against which a trailing edge of the insert ring can be bent, after the ring has been pressed into the arcuate section 346. The advantage of this is that the joint formed has improved axial strength when an axial force acts on separate inner ring 310 in the direction indicated by the arrow.

A still further example of a groove design for use in the invention is shown in FIG. 3c. This groove is similar to the groove of FIG. 3b, and has an arcuate section 346 with a first side 342 and a second side 345 with respect to a reference line that passes through an apex 348 of the arcuate section. The first side 342 is defined as the side closer to the entrance side 350 of the groove 340. At the first side 342 of the arcuate section 346, the groove of FIG. 3c is identical to that of FIG. 3b. At the second side 345, the groove of FIG. 3c differs. The curvature of the concave portion 325 at the second side 345 increases towards an axial extremity of the groove. Correspondingly, the curvature of convex portion 315 increases towards its axial extremity. The groove itself is axially delimited by an abutment 317 of the separate inner ring 310. Thus, when the insert ring is pressed in, its leading edge will be bent upwards by the curvature of the concave portion 325 at the second side 345, such that the leading edge is guided into the groove part defined by the abutment 317 and the second side of the concave portion.

In effect, the deformed insert ring will "hook" around the convex portion 315. In comparison with FIG. 3b, the joint formed after the insert ring is pressed into the groove of FIG. 3c will comprise more material around the convex portion 315 at the second side 345. This means that if the separate inner ring 310 is subjected to an axial force in the direction indicated by the arrow, more material needs to shear off before the joint fails; i.e. the joint has improved axial strength in the indicated direction.

Figure 4:
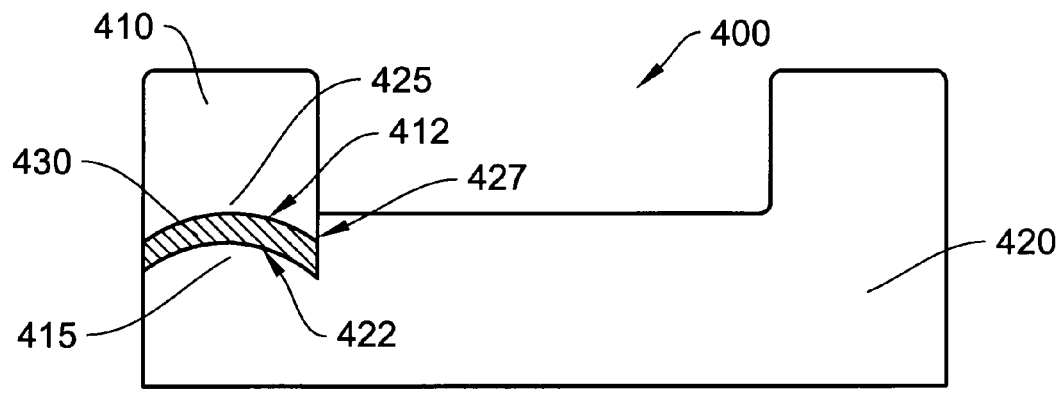
FIG. 4 is a cross-sectional view of a further example of an assembly according to the invention.

A third embodiment of part of an assembly formed according to the invention is shown in cross-section in FIG. 4. The assembly 400 is an inner ring of a cylindrical roller bearing, comprising a flange part 410 joined to a ring part 420 by means of an insert ring 430 pressed into a groove between a first joining surface 412 of the flange part and a second joining surface 422 of the ring part 420. In this example, the arcuate section of the groove has been formed by providing the first joining surface 412 with the concave portion 425 and the second joining surface 422 with the convex portion 415. Further, the ring part 420 comprises an axial abutment 427 for an opposing axial surface of the flange part 410. This is advantageous in that the axial abutment 427 not only provides additional axial locking in one direction, but also provides a reference surface against which the flange part can be held, prior to insertion of the insert ring 430.

Figure 5:
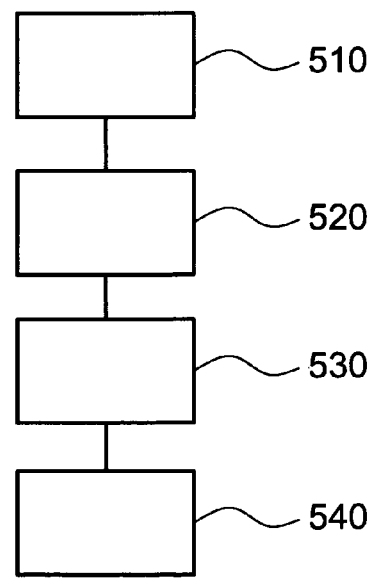
FIG. 5 is a flow chart of a method of joining according to the invention.

The invention is not restricted to the joining of parts of bearing components, and the corresponding method may be utilized in any application where it is advantageous to join first and second components by means of an intermediate component pressed into a gap between radially opposite joining surfaces of the first and second components. One embodiment of the method of the invention is depicted by the flow chart of FIG. 5.

In a first step 510, a concave joining surface is formed on one of the first and second components.

In a second step 520, a convex joining surface is formed on the other of the first and second components.

In a third step 530, the first component is positioned coaxially around the second component, such that the convex and concave joining surfaces are radially opposite each other and a radial gap is formed therebetween.

In a fourth step, an insert ring is pressed into the gap, such that the ring is deformed to adopt the shape of the radial and thereby form a joint between the first and second components.

A number of aspects/embodiments of the invention have been described. It is to be understood that each aspect/embodiment may be combined with any other aspect/embodiment. The invention may thus be varied within the scope of the accompanying patent claims.

REFERENCE NUMERALS

100 Flanged bearing ring
110 Flange part

112 First joining surface of flange part
115 Convex portion of first joining surface
120 Ring part
122 Second joining surface of ring part
125 Concave portion of second joining surface
130 Insert ring
132 First deformed section of insert ring
135 Second deformed section of insert ring
140 Groove between first and second joining surfaces
142 First side of grove
145 Second side of groove
148 Groove apex
150 Entrance side of groove
170 Reference line
t Thickness of insert ring
$r_1, r_3$ First and third radius of convex portion
$r_2, r_4$ Second and Fourth radius of concave portion
$a_1$ Angle of convex portion at first side
$a_2$ Angle of concave portion at second side
200 Hub unit
210 Separate inner ring
220 Flanged inner ring
225 Nose part of flanged inner ring
230 Insert ring
260 Flanged outer ring
265 First row of rolling elements
270 Second row of rolling elements
275 First inner raceway
280 Second inner raceway
285 Face splines
310 Separate inner ring
312 First joining surface of separate inner ring
315 Convex portion of first joining surface
316 Cylindrical portion of first joining surface
317 Abutment of separate inner ring
320 Flanged inner ring
322 Second joining surface of flanged inner ring
325 Concave portion of second joining surface
326 Cylindrical portion of second joining surface
340 Groove
342 First side of arcuate section of groove
345 Second side of arcuate section of groove
346 Arcuate section of groove
347 Cylindrical section of groove
348 Apex of convex portion/groove apex
350 Entrance side of groove
360 Axial side face of first joining surface
x Axial length of arcuate section
y Axial length of cylindrical section
400 Inner ring of cylindrical roller bearing
410 Flange part
412 First joining surface
415 Convex portion
420 Ring part
422 Second joining surface
425 Concave portion
427 Axial abutment of ring part
430 Joint formed by insert ring

The invention claimed is:

1. A wheel hub bearing unit comprising:
a first component comprising an inner ring having opposing first and second axial ends and comprising a first inner raceway defined on an outer surface thereof for receiving a first row of rolling elements, and a first joining surface defined on an inner surface thereof;
a second component comprising a flanged inner ring having an axially-extending nose part disposed at a first axial end thereof and defining a second joining surface, the flanged inner ring comprising a second inner raceway defined on an outer surface thereof for receiving a second row of rolling elements, and an annular shoulder disposed between the nose part and the second inner raceway;
the first component being mounted on the nose part such that the second axial end abuts the shoulder and the first joining surface is arranged coaxially and spaced in a juxtaposition around the second joining surface, thereby defining an annular groove between the first and second joining surfaces, wherein:
the first and second joining surfaces comprise radially opposite cylindrical portions at a first entrance side of the groove such that the groove comprises a cylindrical section, and
the second joining surface comprises a concave portion and the first joining surface comprises a convex portion, radially opposite from the concave portion, each at a second side of the groove, such that the groove comprises an arcuate section; and
an insert ring that is pressed into the groove via the cylindrical section at the entrance side of the groove and deformed so as to adopt the shape of the arcuate section, and wherein the insert ring has a volume that is at least equal to a volume of the cylindrical and arcuate sections of the groove.

2. The bearing unit according to claim 1, wherein the convex portion has an apex with a diameter that is equal to a maximum diameter of the second joining surface, at the entrance side of the groove.

3. The bearing unit according to claim 1, wherein at the first side of the groove, part of the convex portion is defined by a first radius ($r_1$) and part of the concave portion is defined by a second radius ($r_2$) different than the first radius ($r_1$).

4. The bearing unit according to claim 3, wherein a difference between the first radius ($r_1$) and the second radius ($r_2$) is equal to a thickness (t) of the insert ring before the insert ring is inserted in the groove.

5. The bearing unit according to claim 3, wherein at the second side of the groove, part of the convex portion is defined by a third radius ($r_3$) which is substantially equal to the first radius ($r_1$).

6. The bearing unit according to claim 3, wherein at the second side of the groove, part of the convex portion is defined by a third radius ($r_3$) which is smaller than the first radius ($r_1$).

7. The bearing unit according to claim 3, wherein at the second side of the groove, part of the concave portion is defined by a fourth radius ($r_4$) which is smaller than the second radius ($r_2$).

8. The bearing unit according to claim 1, wherein the insert ring is made of a heat-treatable steel with a yield strength of 800-1200 MPa, and
at the first side of the groove, a surface of the convex portion has a maximum angle ($a_1$) relative to a reference line of between 28 and 35 degrees, and
at the second side of the groove, a surface of the concave portion has a maximum angle ($a_2$) relative to the reference line of between 28 and 35 degrees.

9. The bearing unit according to claim 1, wherein the insert ring is made of a steel material with a yield strength of 250-700 MPa, and
at the first side of the groove, the surface of the convex portion has a maximum angle ($a_1$) of between 35 and 42 degrees, and at the second side of the groove, the surface of the concave portion has a maximum angle ($a_2$) of between 35 and 42 degrees.

10. The bearing unit according to claim 1, wherein the first joining surface is axially delimited by an abutment.

11. The bearing unit according to claim 1, wherein an inboard axial side face of the flanged inner ring is provided with face splines for driven rotation of the bearing unit.

12. The bearing unit according to claim 1, wherein the insert ring is formed from tube material.

13. The bearing unit according to claim 1, wherein the insert ring is formed from bent sheet material.

14. The bearing unit according to claim 13, wherein the insert ring is formed from two or more sections, at least one of which comprises a radial extension, and a joining surface of the groove comprises a corresponding radial extension, such that the insert ring is rotationally locked with respect to both the first and second components.

15. The bearing unit according to claim 1, wherein the groove and the insert ring have a circular cross-section.

16. The bearing unit according to claim 1, wherein the groove and the insert ring have a non-circular cross-section.

17. A method of joining first and second components of a wheel hub bearing unit, the method comprising steps of:
   providing a first component comprising an inner ring having opposing first and second axial ends and comprising a first inner raceway defined on an outer surface thereof for receiving a first row of rolling elements, and a first joining surface defined on an inner surface thereof;
   providing a second component comprising a flanged inner ring having an axially-extending nose part disposed at a first axial end thereof and defining a second joining surface, the flanged inner ring comprising a second inner raceway defined on an outer surface thereof for receiving a second row of rolling elements, and an annular shoulder disposed between the nose part and the second inner raceway;
   arranging the first component coaxially around the nose part such the second axial end abuts the shoulder and the first joining surface radially opposes and is spaced from the second joining surface to form an annular gap therebetween, wherein:
   the first and second joining surfaces comprise radially opposite cylindrical portions at a first entrance side of the gap such that the gap comprises a cylindrical section, and
   the second joining surface comprises a concave portion and the first joining surface comprises a convex portion, radially opposite from the concave portion, each at a second side of the groove, such that the gap comprises an arcuate section; and
   pressing an insert ring into the gap via the cylindrical section at the entrance side of the gap, the insert ring having a thickness substantially the same as a maximum thickness of the gap, such that the insert ring is deformed to adopt the shape of the arcuate section, and wherein the insert ring has a volume that is at least equal to a volume of the cylindrical and arcuate sections of the gap.

\* \* \* \* \*